US008117399B2

(12) United States Patent  (10) Patent No.: US 8,117,399 B2
Greenberg et al.  (45) Date of Patent: Feb. 14, 2012

(54) PROCESSING OF COHERENT AND INCOHERENT ACCESSES AT A UNIFORM CACHE

(75) Inventors: David F. Greenberg, Austin, TX (US); Michael C. Alexander, Austin, TX (US); Kathryn C. Stacer, Round Rock, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 357 days.

(21) Appl. No.: 12/437,115

(22) Filed: May 7, 2009

(65) Prior Publication Data

US 2010/0287342 A1 Nov. 11, 2010

(51) Int. Cl.
*G06F 12/08* (2006.01)
(52) U.S. Cl. ........................................ 711/141; 711/125
(58) Field of Classification Search .................. 711/141, 711/125
See application file for complete search history.

(56) References Cited

U.S. PATENT DOCUMENTS

| 5,930,821 | A | 7/1999 | Gaskins et al. |
| 7,383,398 | B2 | 6/2008 | Looi et al. |
| 7,404,046 | B2 | 7/2008 | Goodman et al. |
| 2005/0055384 | A1* | 3/2005 | Ganesh et al. ................ 707/202 |

* cited by examiner

*Primary Examiner* — Michael Tran

(57) ABSTRACT

Each cacheline of a unified cache storing information is marked as incoherent if the information was acquired incoherently or marked as coherent if the information was acquired coherently. A subsequent incoherent read access to a cacheline can result in a cache hit and a return of the cached information regardless of whether the cacheline is marked as coherent or incoherent. However, a subsequent coherent read access to a cacheline marked as incoherent will be returned as a cache miss regardless of whether the cacheline includes information sought by the coherent read access. In response to a cache miss for a coherent read access, a global snoop is initiated so as to query all other target components within the same coherency domain. In contrast, a cache miss resulting from an incoherent read access is processed using a non-global snoop to a limited set of one or a few target components in the coherency domain.

19 Claims, 4 Drawing Sheets

PROCESSING OF COHERENT AND INCOHERENT ACCESSES AT A UNIFORM CACHE

FIELD OF THE DISCLOSURE

The present disclosure relates to data processing and more particularly to cache coherency in a processing device.

BACKGROUND

Processing devices having multiple processor cores often implement a coherency mechanism to maintain coherency between the caches of the different processor cores. These caches often are implemented as unified caches (i.e., configured to store both instruction information and data information). In a typical unified cache, all stored information is kept coherent. As a result, for every cache miss within the processing device, every other target component in the same coherency domain must be queried (or snooped) via a shared interconnect for the identified information. These snoop operations can lead to congestion of the interconnect. The severity of this congestion compounds as more processor cores are utilized. Accordingly, an improved technique for managing coherency in a processing device implementing unified caches would be advantageous.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-4 illustrate example techniques for maintaining cache coherency of a unified cache in a processing device. In one embodiment, each cacheline storing information (data or instruction) is marked as incoherent if the information was acquired incoherently or marked as coherent if the information was acquired coherently. A subsequent incoherent read access to a cacheline by a processor core can result in a cache hit and a return of the cached information regardless of whether the cacheline is marked as coherent or incoherent. However, a subsequent coherent read access to a cacheline marked as incoherent will be returned as a cache miss regardless of whether the cacheline includes information sought by the coherent read access (i.e., regardless of whether there is an address match that indexes the cacheline). In response to a cache miss for a coherent read access, a global snoop is initiated by the processor core so as to query all other target components within the same coherency domain. In contrast, the processor core can recover from a cache miss resulting from an incoherent read access using a non-global snoop to a limited set (i.e., subset) of one or a few target components in the coherency domain. This recovery from cache misses to cachelines marked as incoherent via non-global snoops reduces the bandwidth usage of the interconnect compared to conventional systems, which typically maintain all information in the cache as coherent and thus require querying every target component in the coherency domain in response to a cache miss.

The illustrated techniques provide particular benefit in the context of instruction fetches. Instruction code typically is not modified and thus does not need to be maintained as coherent. Accordingly, instruction fetches do not need to be sent out to memory as a coherent, or global, query. In contrast, data may have been modified in another cache, and thus a cache miss to data conventionally would be sent out to memory as a global query, even when a fetch was used to acquire the data. Accordingly, in accordance to the techniques described herein, instruction fetches can hit on cachelines marked as either coherent or incoherent, whereas coherent data loads that hit on cachelines that store instruction information (or is otherwise marked as incoherent) will be returned as a cache miss. As such, the snoop overhead for instruction fetches for the other processor cores in the processing device is reduced, and a programmer can construct the memory distribution without requiring that all instructions be stored at non-global memory pages.

Figure 1:
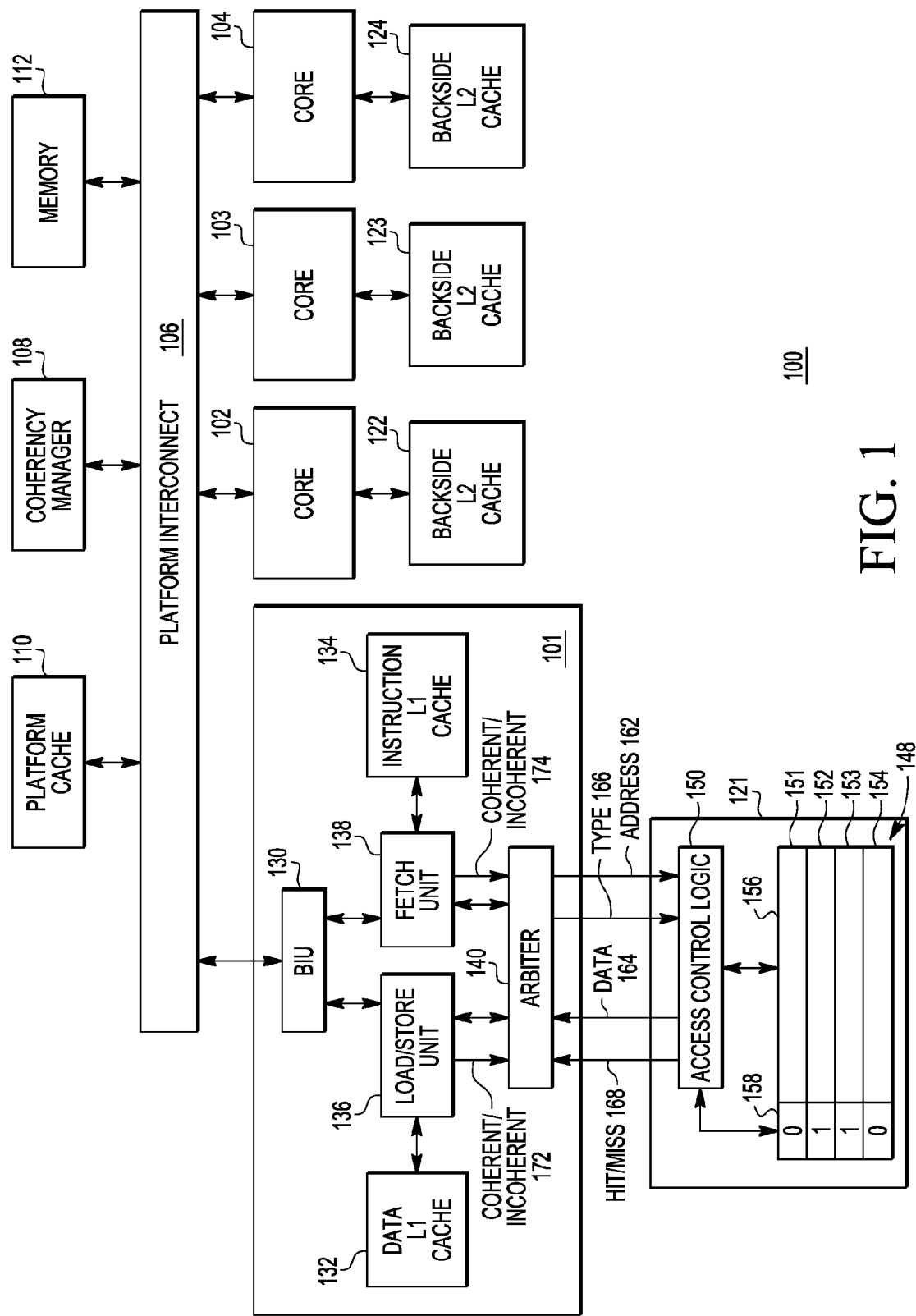
FIG. 1 is a diagram illustrating a processing device in accordance with at least one embodiment of the present disclosure.

FIG. 1 illustrates a processing device 100 in accordance with at least one embodiment of the present disclosure. The processing device 100 includes a plurality of processor cores (e.g., processor cores 101, 102, 103, and 104) connected via a platform interconnect 106. The processing device 100 further includes a coherency manager 108 and one or more platform-level storage components, such as a platform cache 110 and a memory 112 (e.g., a random access memory (RAM)). Some or all of the processor cores each maintains a backside unified cache (e.g., a level 2 (L2) cache) configured to store both instruction information and data information, such as backside caches 121, 122, 123, and 124 for processor cores 101, 102, 103, and 104, respectively. For purposes of illustration, it is assumed that all of the target components illustrated in FIG. 1 (e.g., the platform cache 110, the memory 112, any caches (not shown) of the coherency manager 108, the backside caches 121-124, and the caches of the processor cores 101-104) are included in the same coherency domain.

As depicted in FIG. 1, the processor core 101 includes a bus interface unit (BIU) 130, a data level 1 (L1) cache 132, an instruction L1 cache 134, a load/store unit 136, a fetch unit 138, an arbiter 140, as well as other components typically implemented in a processor core, such as a processing pipeline (including one or more arithmetic logic units (ALUs) and one or more floating point units (FPUs)), input/output (I/O) controllers and interfaces, intra-processor buses and interconnects, and the like (omitted for ease of illustration). The other processor cores 102-104 are similarly configured. For ease of illustration, the general operation of each of the processor cores 101-104 is discussed below with reference to the processor core 101.

The BIU 130 serves as the interface between the components of the processor core 101 and the platform interconnect 106 by generating transactions for output to the platform interconnect 106 and performing the initial processing of transactions received from the platform interconnect. Further, in at least one embodiment, the BIU 130 initiates snoops of other target components via the platform interconnect 106 in order to acquire information for the processor core as described below.

Data information and instruction information generated or processed by the processor core 101 are stored in the data L1 cache 132 and the instruction L1 cache 134, respectively. In an alternate embodiment, the processor core 101 can implement a unified L1 cache to store both data information and instruction information. The load/store unit 136 is configured to conduct load operations and store operations for the processor core 101. The load operations include loading data information from an external source (e.g., the platform cache 110 or the memory 112) to one or both of the data L1 cache 132 or the backside cache 121. The store operations include storing information generated by the processor core 101 at an external source, wherein either or both of the data L1 cache 132 and the backside cache 121 can be used to temporarily store the information for the store operation, which is subsequently transferred from the cache to the external component (e.g., via an eviction of the information or during a coherency management operation). The fetch unit 138 is configured to fetch instruction information from an external source (e.g., the platform cache 110 or the memory 112) and buffer the fetched instruction information in one or both of the instruction L1 cache 134 or the backside cache 121. The arbiter 140 is configured to arbitrate access to the backside cache 121 between access requests by the load/store unit 136 and the fetch unit 138.

As depicted in FIG. 1, the backside cache 121 associated with the processor core 101 includes a cache array 148 and access control logic 150 to control access to the cache array 148. The cache array 148 includes one or more cachelines (e.g., cachelines 151, 152, 153, and 154 in the illustrated example) to store one or both of instruction information and data information. Each cacheline includes a data field 156 to store corresponding information. Each cacheline also is associated with a corresponding incoherency status field 158 that stores an incoherency bit (or "N-bit") identifying whether the information stored in the corresponding data field 158 is marked as coherent or incoherent for coherency management purposes. Each cacheline further can include or be associated with other fields, such as an address field, an error correction field, and other status fields (omitted for clarity purposes). The backside caches 122, 123, and 124 are similarly configured.

The access control logic 150 is configured to manage access to the cached information of the cache array 148 based on control signaling received from the processor core 101 and based on status information associated with the corresponding cached information. The control signaling conducted between the arbiter 140 and the access control logic 150 includes, for example, address signaling 162, data signaling 164, type signaling 166, and hit/miss signaling 168. The address signaling 162 provides address information representative of the address associated with the cache access. The data signaling 164 is used to transfer the information to be stored in the corresponding cacheline of the backside cache 121 (for a write access) and to transfer the information read from the corresponding cacheline of the backside cache 121 (for a read access). The hit/miss signaling 168 signals whether there is a match between the address information provided via the address signaling 162 and an address stored in an address field (not shown) of the cache array 148 (i.e., whether there is a cache hit or miss). The type signaling 166 identifies the type of access to be performed (e.g., a read access, a write access, a lock access, a touch access, etc.). The type signaling 166 further identifies whether the access is a coherent access or an incoherent access. In one embodiment, the coherency/incoherency status of a cache access is supplied by the component initiating the cache access. To illustrate, the load/store unit 136 can provide an indicator 172 along with an access request to the arbiter 140 that identifies the corresponding access request as coherent or incoherent. Likewise, the fetch unit 138 can provide an indicator 174 along with an access request to the arbiter so as to identify the corresponding access request as coherent or incoherent. In one embodiment, access operations by the load/store unit 136 (e.g., data load operations and data store operations) can be treated as coherent accesses and access operations by the fetch unit 138 (e.g., instruction fetch operations) can be treated as incoherent accesses.

In operation, information is communicated among the processor cores 101-104, the coherency manager 108, the platform cache 110, and the memory 112 via transactions conducted via the platform interconnect 106, which can include a cross-bar switch, one or more buses, and the like. The transactions can include, for example, load operations to load information from the memory 112 or platform cache 110 into the backside cache of a processor core, store operations to store information from a processor core to the memory 112 or the platform cache 110, and data transfer operations to transfer information from one processor core to another processor core. The transactions conducted via the platform interconnect 106 further can include coherency management operations, such as snoop queries to maintain the coherency of coherent information among the backside caches, the platform cache 110, and the memory 112. The coherency manager 108 facilitates these coherency transactions. To illustrate, in one embodiment, the coherency manager 108 conducts the snoop queries to ensure coherency among the targets of the processing device 100. Coherency of information utilized by the processing device 100 can be maintained in accordance with, for example, the MESI (Modified-Exclusive-Shared-Invalid) protocol.

When processing a write access to store information at a cacheline of the backside cache 121, the access control logic 150 analyzes the type signaling 166 to determine whether the processor core 101 has signaled that whether the write access is a coherent write access or incoherent write access and then sets the N-bit of the corresponding incoherency status field 158 to the bit value corresponding to the coherency status (e.g., assigning the N-bit a value of "1" for incoherent information or a value of "0" for coherent information). When accessing a particular cacheline of the backside cache 121 for a read access, the access control logic 150 determines whether the address information supplied by the address signaling 162 indexes a cacheline of the cache array 148 (i.e., whether there is a match between the address information and an address value stored in an address field of a cacheline of the cache array 148). If no cacheline is indexed, the access control logic 150 signals a cache miss via the hit/miss signaling 168. In the event a cacheline is indexed, the access control logic 150 analyzes the type signaling 166 to determine whether the processor core 101 has signaled that the read access is to be a coherent read access or an incoherent read access. In the event that the read access is identified as an incoherent read access, the access control logic 150 processes the read access as a conventional access by returning the information stored in the data field 156 of the indexed cacheline via the data signaling 164 and signals a cache hit via the hit/miss signaling 168. In the event that the read access is identified as a coherent read access, the access control logic 150 first accesses the N-bit stored in the incoherent status field 158 of the indexed cacheline to determine whether the cacheline has been marked as coherent or incoherent. If marked coherent, the access control logic 150 processes the read access as a conventional access by returning the information stored in the data field 156 of the cacheline via the data signaling 164 and signals a cache hit via the hit/miss signaling 168. In the event that the cacheline is marked incoherent, the access control logic 150 ceases further processing of the coherent read access and signals a cache miss via the hit/miss signaling 168 even though the cache array 148 includes information for the associated address.

In response to receiving an indication of a cache miss, the BIU 130 can initiate a snoop via the platform interconnect 106 to obtain the requested information from a target component (e.g., the memory 112, the platform cache 110, or from a cache of another processor core). In the event that the cache miss is in response to a coherent cache access, the BIU 130 can initiate a global (i.e., coherent) snoop that queries all of the target components of the coherency domain to coherently acquire the requested information with the assistance of the coherency manager 108. In the event that the cache miss is in response to an incoherent cache access, the BIU 130 can initiate a non-global (i.e., incoherent) snoop to fewer target components and without requiring the involvement of the coherency manager 108 to maintain coherency across the system for the acquired incoherent data. In this manner, cache misses to incoherent cachelines can be processed with fewer queries of other target components, thereby requiring less traffic on the platform interconnect 106. This is particularly useful when a cache miss occurs for an instruction fetch as the instruction information typically is not maintained as coherent and thus it is not necessary to query each and every target component to acquire the most recent version of the instruction information.

Figure 2:
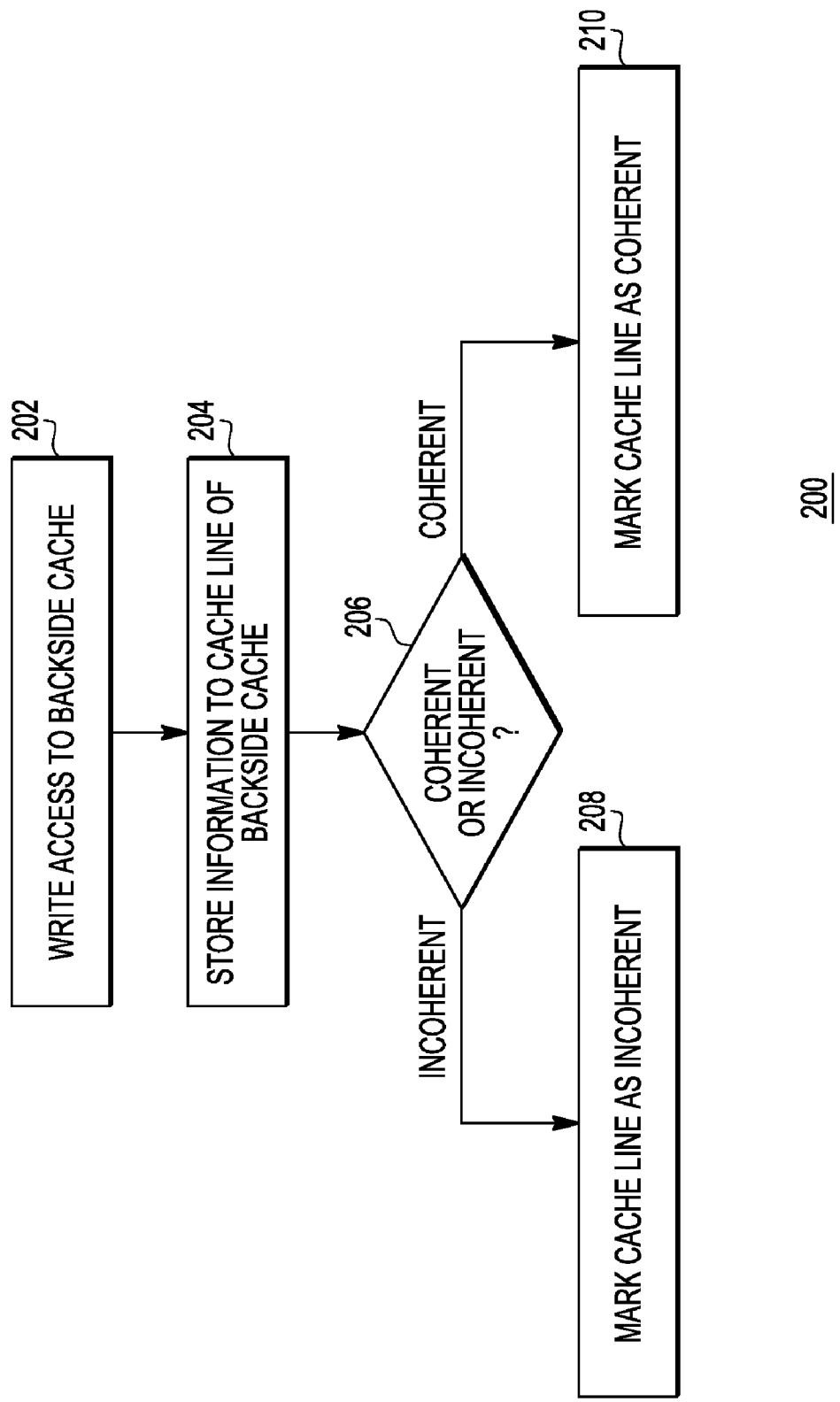
FIG. 2 is a flow diagram illustrating a method for processing a write access to a unified cache of the processing device of FIG. 1 in accordance with at least one embodiment of the present disclosure.

FIG. 2 illustrates an example method 200 for processing a write access to a unified cache in accordance with at least one embodiment of the present disclosure. For purposes of illustration, the method 200 is described in the context of the processing device 100 of FIG. 1. At block 202, a write access is initiated for the purposes of caching information at the backside cache 121. The write access can be initiated by the load/store unit 136 for data information or the write access can be initiated by the fetch unit 138 for the storage of instruction information. Accordingly, the signaling associated with the write access includes the address signaling 162 to indicate the address information associated with the information to be stored, the data signaling 164 to provide the information to be stored, and the type signaling 166 identifying the operation as a write access and identifying whether the information is to be stored coherently or incoherently. At block 204, the access control logic 150 of the backside cache 121 identifies an appropriate cacheline and stores the provided information at the cacheline.

At block 206, the access control logic 150 determines whether the provided information was acquired coherently or incoherently based on the type signaling 166. If acquired incoherently, at block 208 the access control logic 150 marks the cached information as incoherent by setting the N-bit of the corresponding incoherency status field 158 of the cacheline to a first value (e.g., a "1") to identify the corresponding information as incoherent. If the information was acquired coherently, at block 210 the access control logic 150 marks the stored information as coherent by setting the N-bit to a second value (e.g., a "0") to identify the corresponding information as coherent.

Figure 3:
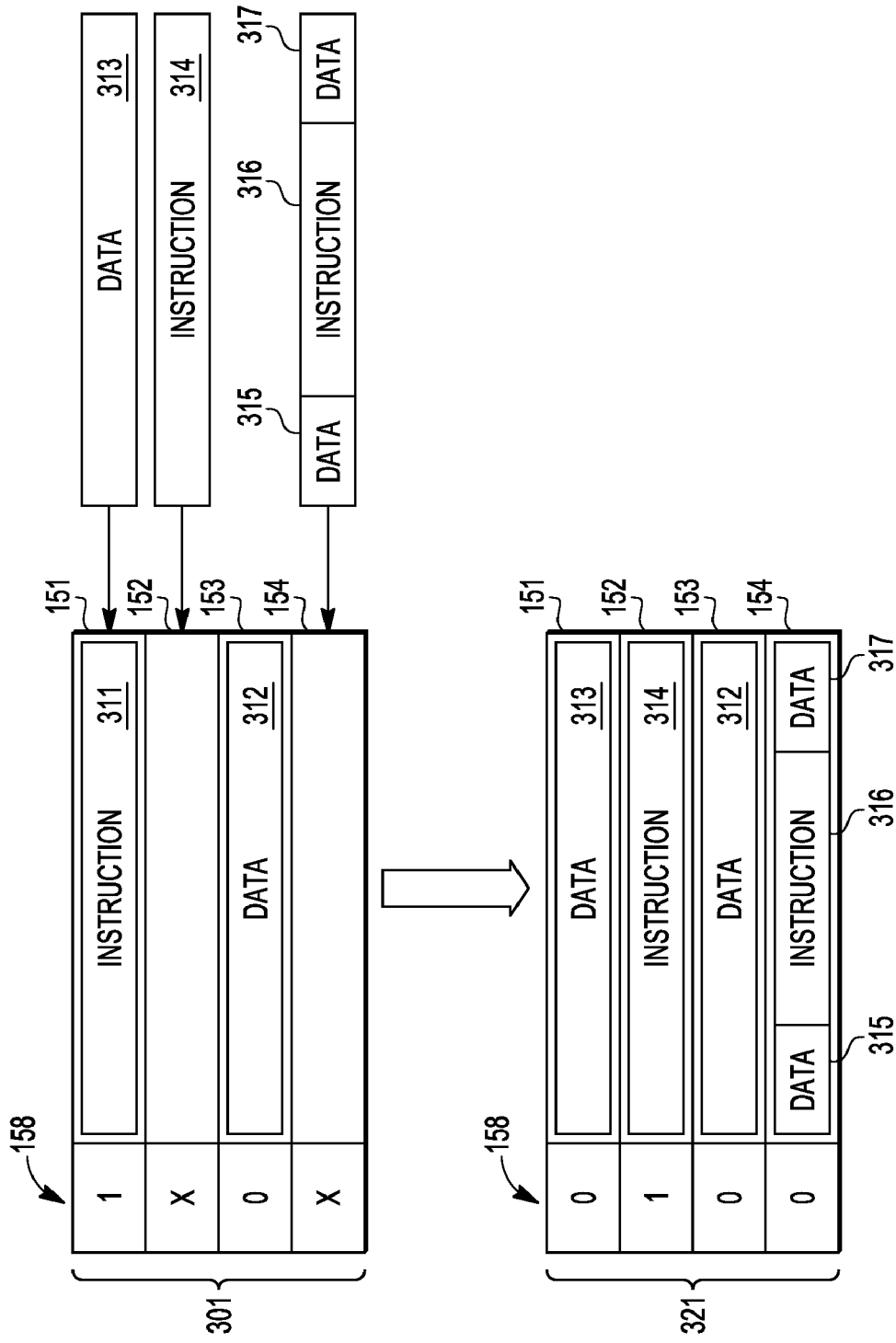
FIG. 3 is a diagram illustrating various examples of write accesses to a unified cache in accordance with at least one embodiment of the present disclosure.

FIG. 3 illustrates various examples of the process of method 200 in accordance with at least one embodiment of the present disclosure. In initial state 301, the backside cache 121 stores instruction information 311 at cacheline 151, data information 312 at cacheline 153, and cachelines 152 and 154 are empty or store invalid information. As noted above, instruction information typically is acquired incoherently and thus the N-bit of the incoherency status field 158 of the cacheline 151 is set to "1". For this example, the data information 312 was acquired coherently and thus the N-bit of the incoherency status field 158 of the cacheline 153 is set to "0".

In a set of write accesses, a cacheline of coherently acquired data information 313 is stored to the cacheline 151 (overwriting or evicting the instruction information 311), a cacheline of incoherently acquired instruction information 314 is stored to the cacheline 152, and a cacheline of coherently acquired data information 315, instruction information 316, and data information 317 is stored to the cacheline 154. As illustrated by the subsequent state 321, the N-bit of the cacheline 151 is set to "0", the N-bit of the cacheline 152 is set to "1", the N-bit of the cacheline 153 is set to "0", and the N-bit of the cacheline 154 is set to "0" by the access control logic 150 (FIG. 1) as a result of these write accesses.

Figure 4:
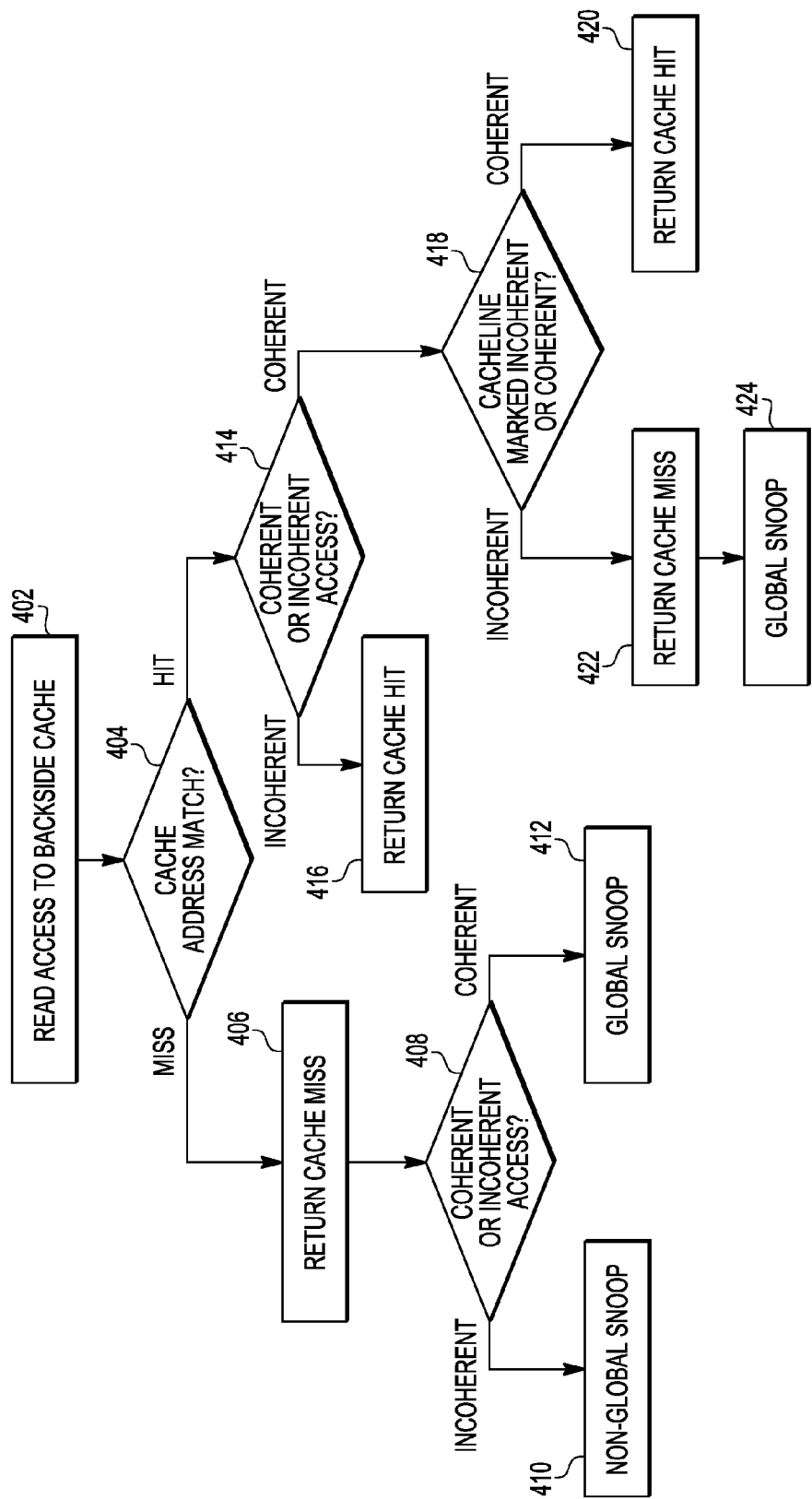
FIG. 4 is a flow diagram illustrating a method for processing a read access to a unified cache of the processing device of FIG. 1 in accordance with at least one embodiment of the present disclosure.

FIG. 4 illustrates an example method 400 for processing a read access at a unified cache having incoherency status indicators in accordance with at least one embodiment of the present disclosure. For purposes of illustration, the method 400 is described in the context of the processing device 100 of FIG. 1. At block 402, the processor core 101 initiates a read access to obtain information from the backside cache 121. The read access can be initiated by the load/store unit 136 to obtain data information or the read access can be initiated by the fetch unit 138 to obtain instruction information. Accordingly, the signaling associated with the read access includes the address signaling 162 to indicate the address information associated with the information to be accessed and the type signaling 166 identifying the operation as a read access and identifying whether the read access is a coherent read access or an incoherent read access.

At block 404, the access control logic 150 of the backside cache 121 determines whether the address information provided with the address signaling 162 matches the address value stored in an address field of one of the cachelines (i.e., whether the read access indexes a cacheline of the cache array 148). In the event that there is no address match (i.e., a cache miss), at block 406 the access control logic 150 returns a cache miss via the hit/miss signaling 168. In response to the cache miss, at block 408 the BIU 130 determines whether the read access was a coherent read access (e.g., a read access for data information by the load/store unit 136) or an incoherent read access (e.g., a read access for instruction information by the fetch unit 138). In the event that the read access was an incoherent read access, at block 410 the BIU 130 can initiate a non-global snoop to query one or a few target components of the coherency domain to acquire the identified information. In the event that the read access was a coherent read access, at block 412 the BIU 130 can initiate a global snoop to query each of the target components in the coherency domain to access the identified information from another target.

Returning to block 404, in the event that there is an address match (i.e., a cache hit), the subsequent processing of the read access depends on the coherency status of the read access and the coherency status of the information being sought. Accordingly, at block 414 the access control logic 150 determines whether the read access is a coherent read access or an incoherent read access by, for example, analyzing the coherency status indicated by the type signaling 166 (FIG. 1) provided by the arbiter 140. In the event that the read access is an incoherent read access, at block 416 the access control logic 150 returns a cache hit (signaled via hit/miss signaling 168)

along with the information stored in the indexed cacheline (signaled via the data signaling 164) regardless of the incoherency status of the cacheline marked by the N-bit for the cacheline. However, in the event that the read access is a coherent read access, at block 418 the access control logic 150 accesses the N-bit from the incoherency status field 158 of the corresponding cacheline to determine whether the cacheline has been marked as coherent (e.g., N-bit is set to "0") or incoherent (e.g., N-bit is set to "1"). In the event that the cacheline is marked as coherent, at block 420 the access control logic 150 returns a cache hit (signaled via hit/miss signaling 168) along with the information stored in the corresponding cacheline (signaled via the data signaling 164) for the coherent read access. In the event that the cacheline is marked as incoherent, the access control logic 150 blocks the attempted coherent read access to an incoherent cacheline by returning a cache miss at block 422 (even though there was an address match) via hit/miss signaling 168. In response to the cache miss, at block 424 the BIU 130 determines that the read access was a coherent read access and therefore can initiate a global snoop to all of the target components within the coherency domain to acquire the information sought by the coherent read access.

FIGS. 2 and 4 illustrate the processing of read accesses and write accesses to the unified cache with respect to the coherency status of the cacheline marked by the N-bit associated with the cacheline. The coherency status of the cacheline also controls the operation of other cache management operations. To illustrate, icbi (instruction cache block invalidate) instructions may be permitted to invalidate cachelines marked incoherent, but are blocked from invalidating cachelines marked coherent. As another example, dcbi (data cache block invalidate) instructions may be permitted to invalidate cachelines marked as coherent, but is not required to invalidate cachelines marked incoherent. Touch instructions, such as dcbt (data cache block touch), dcbtst (data cache block touch to store), icbt (instruction cache block touch), and icbtst (instruction cache block touch to store) instructions, can follow the same general principles described above: data transactions can only hit coherent cachelines and instruction transactions can hit either coherent or incoherent cachelines. As another example, lock instructions, such as dcblts (data cache block touch and lock set), icbtls (instruction cache block touch and lock set), dcblc (data cache block lock clear), and icblc (instruction cache block lock clear) instructions, may hit both coherent and incoherent cachelines.

The terms "including", "having", or any variation thereof, as used herein, are defined as comprising. Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

What is claimed is:

1. In a processing device comprising a cache configured to store both instruction information and data information, a method comprising:
  receiving, at the cache, a first read access that is indexed to a first cacheline;
  determining whether the first cacheline is marked as coherent or incoherent;
  in response to determining the first read access is a coherent read access, processing the first read access as a cache miss at a processor core of the processing device in response to determining the first cacheline is marked as incoherent; and
  in response to determining the first read access is an incoherent read access, processing the first read access as a cache hit at the processor core regardless of whether the first cacheline is marked as coherent or incoherent.

2. The method of claim 1, further comprising:
  in response to determining the first read access is a coherent read access:
    processing the first read access as a cache hit at the processor core in response to determining the first cacheline is marked as coherent.

3. The method of claim 1, further comprising:
  in response to determining the read access is a coherent read access:
    processing the first read access as a cache hit at the processor core in response to determining the first cacheline is marked as coherent.

4. The method of claim 1, wherein processing the first read access as a cache miss in response to determining the first cacheline is marked as incoherent comprises:
  performing a global snoop of target components of a coherency domain of the processing device to acquire for the processor core information sought by the coherent read access.

5. The method of claim 1, further comprising:
  receiving, at the cache, a second read access; and
  in response to determining the second read access is not indexed to a cacheline of the cache:
    performing a global snoop of target components of a coherency domain of the processing device to acquire for the processor core information sought by the second read access in response to determining the second read access is a coherent read access; and
    performing a non-global snoop of a subset of the target components of the coherency domain of the processing device to acquire for the processor core information sought by the second read access in response to determining the second read access is an incoherent read access.

6. The method of claim 1, further comprising:
  receiving, at the cache, a write access to store information to the first cacheline;
  marking the first cacheline as incoherent in response to determining the write access is an incoherent write access; and
  marking the first cacheline as coherent in response to determining the write access is a coherent write access.

7. The method of claim 6, further comprising:
  determining the write access is a coherent write access when the information comprises data information associated with a data load operation or a data store operation; and
  determining the write access is an incoherent write access when the information comprises instruction information associated with an instruction fetch operation.

8. The method of claim 6, wherein:
  marking the first cacheline as incoherent comprises storing a first bit value at a predetermined field associated with the first cacheline; and
  marking the first cacheline as coherent comprises storing a second bit value at the predetermined field.

9. The method of claim 1, wherein the cache comprises a backside cache of the processor core.

10. In a processing device comprising a cache configured to store both instruction information and data information, a method comprising:
  processing a coherent read access as a cache miss for a processor core of the processing device in response to determining that a first cacheline that is indexed by the coherent read access is marked as incoherent regardless of whether the first cacheline includes information sought by the coherent read access; and
  processing an incoherent read access as a cache hit at the cache in response to determining that a second cacheline is indexed by the incoherent read access regardless of whether the second cacheline is marked as coherent or incoherent.

11. The method of claim 10, further comprising:
  processing the incoherent read access as a cache miss at the cache in response to determining that the incoherent read access does not index any cacheline of the cache.

12. The method of claim 11, wherein:
  processing the coherent read access as a cache miss comprises performing a global snoop of target components of a coherency domain of the processing device to acquire information sought by the coherent read access for the processor core; and
  processing the incoherent read access as a cache miss comprises performing a non-global snoop of a subset of the target components of the coherency domain to acquire information sought by the incoherent read access for the processor core.

13. The method of claim 10, further comprising:
  determining the first cacheline is marked as incoherent based on a bit value stored in a first field of the cache that is associated with the first cacheline; and
  determining the second cacheline is marked as coherent based on a bit value stored in a second field of the cache that is associated with the second cacheline.

14. A processing device comprising:
  a processor core; and
  a unified cache comprising:
    a cacheline; and
    access control logic to:
      process a read access indexed to the cacheline;
      signal a cache miss to the processor core in response to determining the read access is a coherent read access and the cacheline is marked as incoherent; and
      signal a cache hit to the processor core in response to determining the read access is an incoherent read access regardless of whether the cacheline is marked as incoherent or coherent.

15. The processing device of claim 14, wherein the processor core is to:
  initiate a global snoop of target components of a coherency domain of the processing device to acquire information sought by the read access for the processor core in response to the access control logic signaling a cache miss and the read access comprising a coherent read access; and
  initiate a non-global snoop of a subset of the target components of the coherency domain to acquire information sought by the read access for the processor core in response to the access control logic signaling a cache miss and the read access comprising an incoherent read access.

16. The processing device of claim 14, wherein the unified cache further comprises:
  an incoherency status field associated with the cacheline, the incoherency status field storing a bit value marking the cacheline as either coherent or incoherent.

17. The processing device of claim 16, wherein the access control logic further is to:
  receive a write access indexed to the cacheline;
  store a first bit value to the incoherency status field in response to determining the write access is an incoherent write access; and
  store a second bit value to the incoherency status field in response to determining the write access is a coherent write access.

18. The processing device of claim 17, wherein the access control logic is to:
  determine the write access is a coherent write access when information associated with the write access comprises data information associated with a data load operation or a data store operation; and
  determining the write access is an incoherent write access when the information comprises instruction information associated with an instruction fetch operation.

19. The processing device of claim 14, wherein the unified cache comprises a backside cache of the processor core.

* * * * *